(12) United States Patent
Laurel et al.

(10) Patent No.: US 9,051,787 B2
(45) Date of Patent: Jun. 9, 2015

(54) QUICK CONNECT COUPLING FOR CEMENTING OPERATIONS AND THE LIKE

(75) Inventors: David F. Laurel, Cypress, TX (US); Douglas K. Baugher, Spring, TX (US); Charles J. Pate, II, Mountain Home, AR (US); Kurt R. Koenig, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 372 days.

(21) Appl. No.: 13/495,048

(22) Filed: Jun. 13, 2012

(65) Prior Publication Data

US 2013/0284457 A1    Oct. 31, 2013

Related U.S. Application Data

(60) Provisional application No. 61/639,949, filed on Apr. 29, 2012.

(51) Int. Cl.
| | |
|---|---|
| *E21B 17/05* | (2006.01) |
| *F16L 37/252* | (2006.01) |
| *F16L 37/107* | (2006.01) |

(52) U.S. Cl.
CPC .............. *E21B 17/05* (2013.01); *F16L 37/252* (2013.01); *F16L 37/107* (2013.01)

(58) Field of Classification Search
CPC ....... E21B 17/05; F16L 37/107; F16L 37/252
USPC ................ 166/77.51, 380, 177.4, 378, 242.6, 166/242.9
See application file for complete search history.

(56) References Cited

U.S. PATENT DOCUMENTS

| | | | |
|---|---|---|---|
| 3,895,829 A | 7/1975 | Manson | |
| 3,948,545 A | 4/1976 | Bonds | |
| 6,059,042 A * | 5/2000 | Huber et al. | .................. 166/377 |
| 2006/0283593 A1 | 12/2006 | Robichaux et al. | |

FOREIGN PATENT DOCUMENTS

| | | |
|---|---|---|
| EP | 1589188 A2 | 10/2005 |
| WO | 2011-143654 A2 | 11/2011 |

* cited by examiner

*Primary Examiner* — Yong-Suk (Philip) Ro
(74) *Attorney, Agent, or Firm* — Shawn Hunter

(57) ABSTRACT

Devices and methods are described for quickly connecting and disconnecting a conduit to a port. A quick connect coupling is described for quickly connecting and disconnecting a cement supply conduit to the port of a top drive cement swivel.

13 Claims, 11 Drawing Sheets

QUICK CONNECT COUPLING FOR CEMENTING OPERATIONS AND THE LIKE

This application claims priority to U.S. Provisional Patent Application Ser. No. 61/639,949 filed Apr. 29, 2012.

BACKGROUND OF THE INVENTION

1. Field of the Invention

The invention relates generally to cementing equipment used with oilfield wellhead equipment and, in particular aspects, to couplings that are useful for such equipment.

2. Description of the Related Art

After a hydrocarbon wellbore has been drilled, a casing is typically cemented in along the length of the drilled bore. Cementing equipment is used to do this and typically includes a top drive cement head that permits balls or rubber darts to be dropped into the wellbore during the cementing operation. The cement head also must be capable of flowing cement from a cement supply downwardly into the wellbore. Suitable cementing equipment for these purposes includes a top drive cement head which is available commercially from Baker Hughes Incorporated of Houston, Tex.

SUMMARY OF THE INVENTION

The invention provides methods and devices for quickly connecting and disconnecting a conduit to a port. In a described embodiment, a quick connect coupling is described for quickly connecting and disconnecting a cement supply conduit to the port of a top drive cement swivel. An exemplary quick connect coupling includes a stinger assembly that is reversibly coupled to a breech lock box connector on the cement swivel. Raised keys on the breech lock barrel will interfit with complimentary ridges with a bore of the breech lock connector.

In certain embodiments, a locking arrangement that secures the stinger assembly against rotation within the breech lock connector. In one embodiment, a locking pin is used to lock the stinger assembly into place and against rotation with respect to the cement swivel. An exemplary locking pin is described that is retained by the cement swivel and is axially moveable between unlocked and locked positions. In the locked position, the locking pin will reside within a complimentary indentation within the stinger assembly thereby preventing rotation.

In operation, a user can quickly and easily couple the stinger assembly with the cement swivel easily and without the need for hammers and other tools to be used. A crane may be used to lift and move the stinger assembly and affixed cement conduit to a position that is proximate the breech lock box connector of the cement swivel. An operator can then orient the stinger assembly so that the keys of the stinger assembly are angularly offset from the ridges within the bore. The stinger and breech lock barrel are then inserted into the bore. Thereafter, the user rotates the stinger assembly to align the keys of the stinger assembly with the ridges of the bore. When aligned, each of the keys are preferably located in line with and behind a ridge, preventing the stinger assembly from being withdrawn from the breech lock connector. The locking arrangement is then engaged to lock the stinger assembly in place so that it cannot be rotated with the breech lock connector.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE PREFERRED EMBODIMENTS

Figure 1:
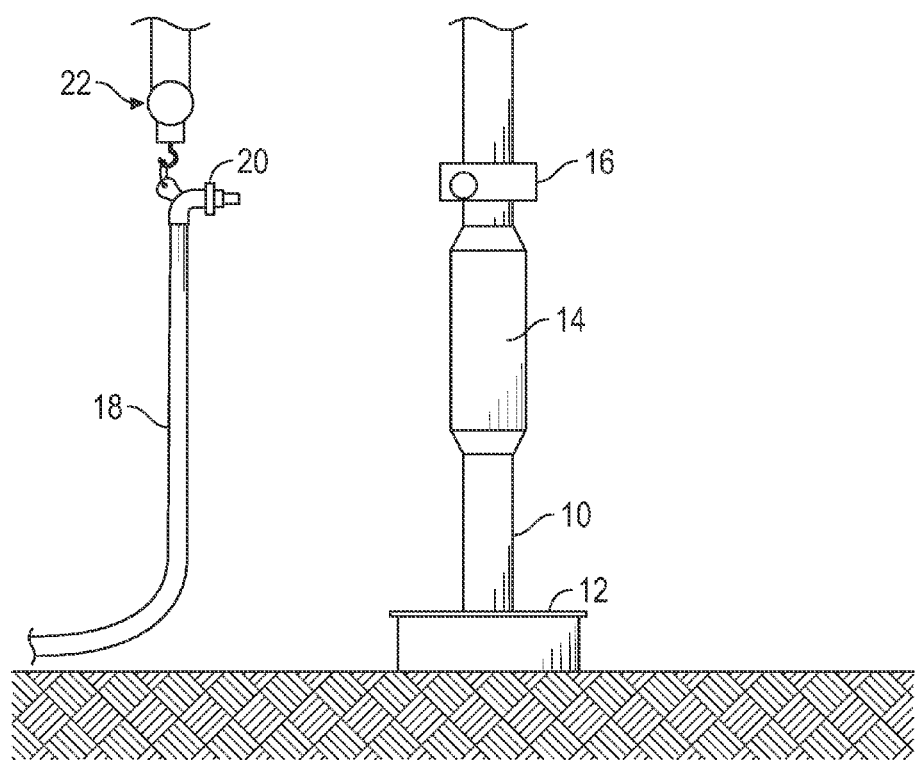
FIG. 1 is a side view of portions of an exemplary wellbore cementing operation.

FIG. 1 illustrates portions an exemplary cementing operation for a wellbore. A tubular working string 10 extends downwardly into a wellhead 12. A cementing tool 14 is incorporated into the working string 10 which typically contains balls and/or plugs which are launched into the working string 10 during a cementing operation. A top drive cement swivel 16 is affixed to the upper end of the cementing tool 14. The cement swivel 16 operates to receive cement and transmit it through a flowpath in the cementing tool 14 so that the cement can be flowed downwardly into the working string 10. FIG. 1 also depicts a cement hose 18 with an affixed stinger assembly 20. Cement can be flowed to the cement swivel 16 when the stinger assembly 20 is coupled to the cement swivel 16. The cement hose 18 and stinger assembly 20 are depicted being lifted by block and tackle 22.

Figure 2:
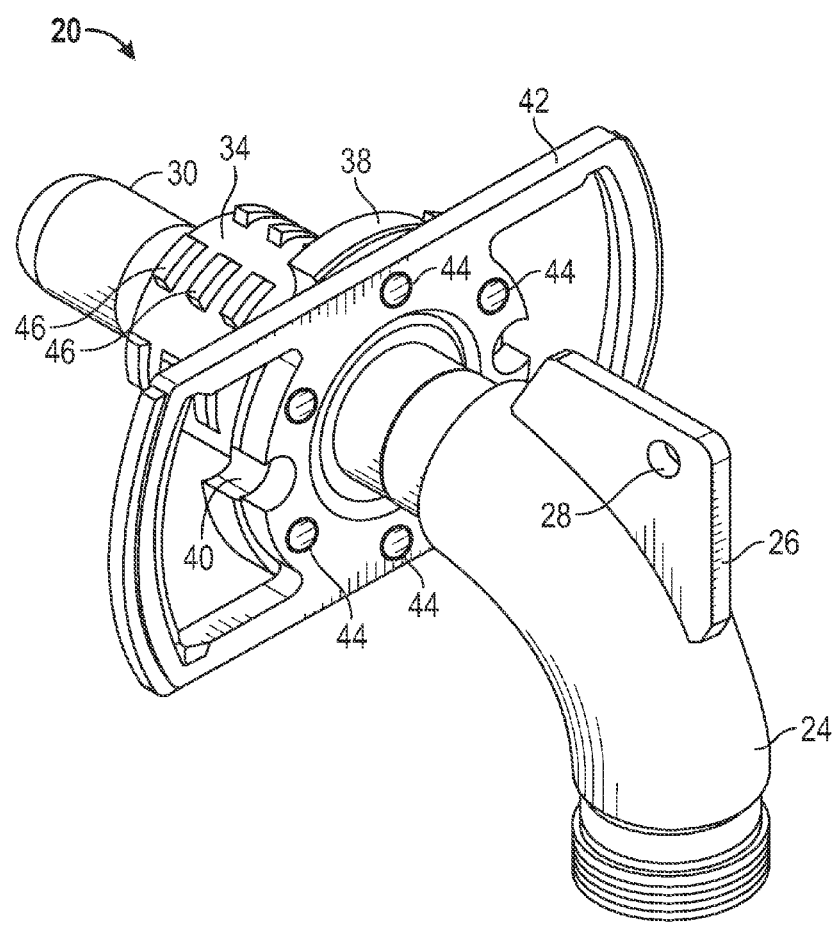
FIG. 2 is an isometric view of an exemplary stinger assembly in accordance with the present invention.
Figure 3:
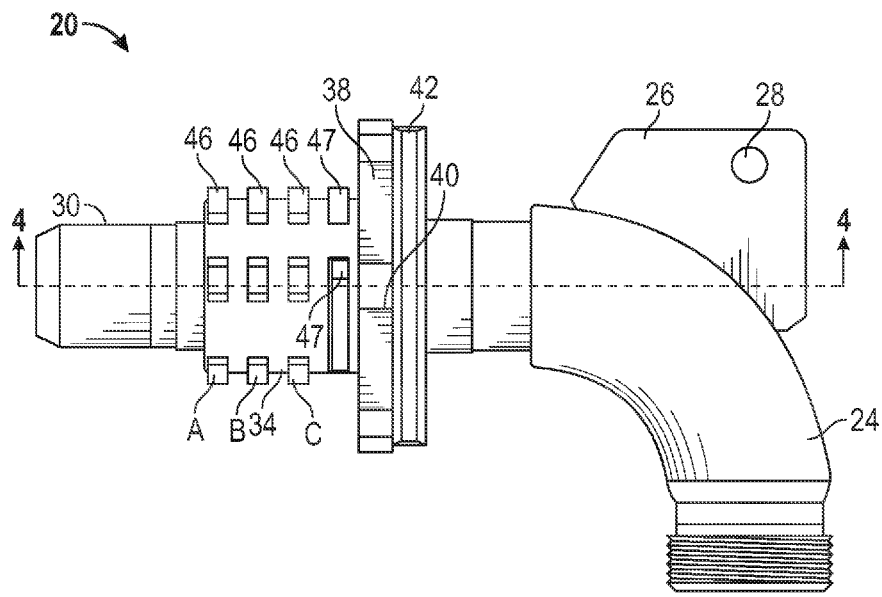
FIG. 3 is a side view of the stinger assembly shown in FIG. 2.
Figure 4:
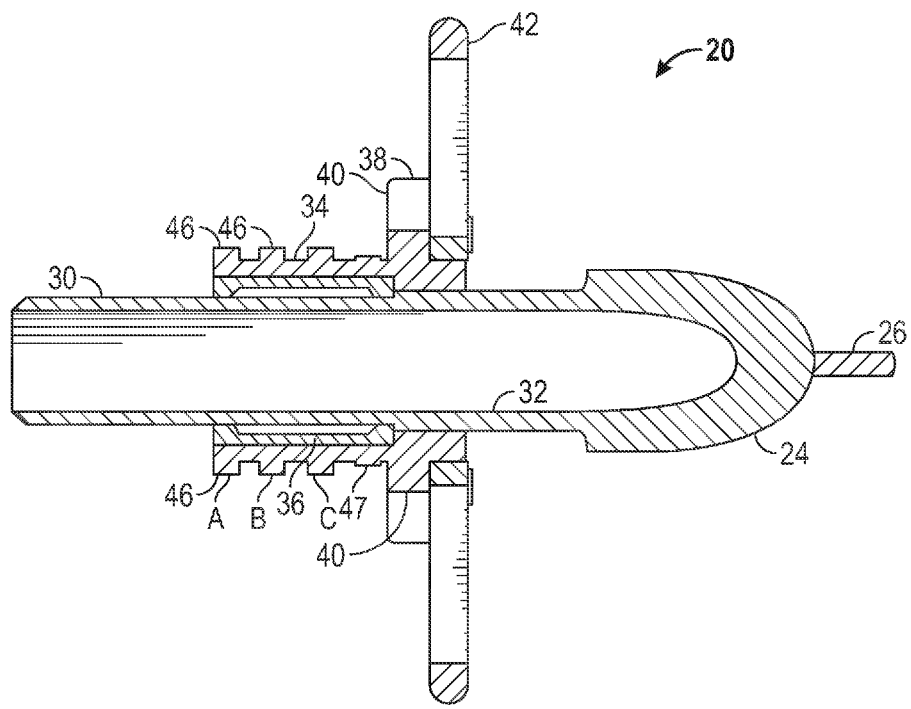
FIG. 4 is a cross-sectional view taken along lines 4-4 in FIG. 3.
Figure 5:
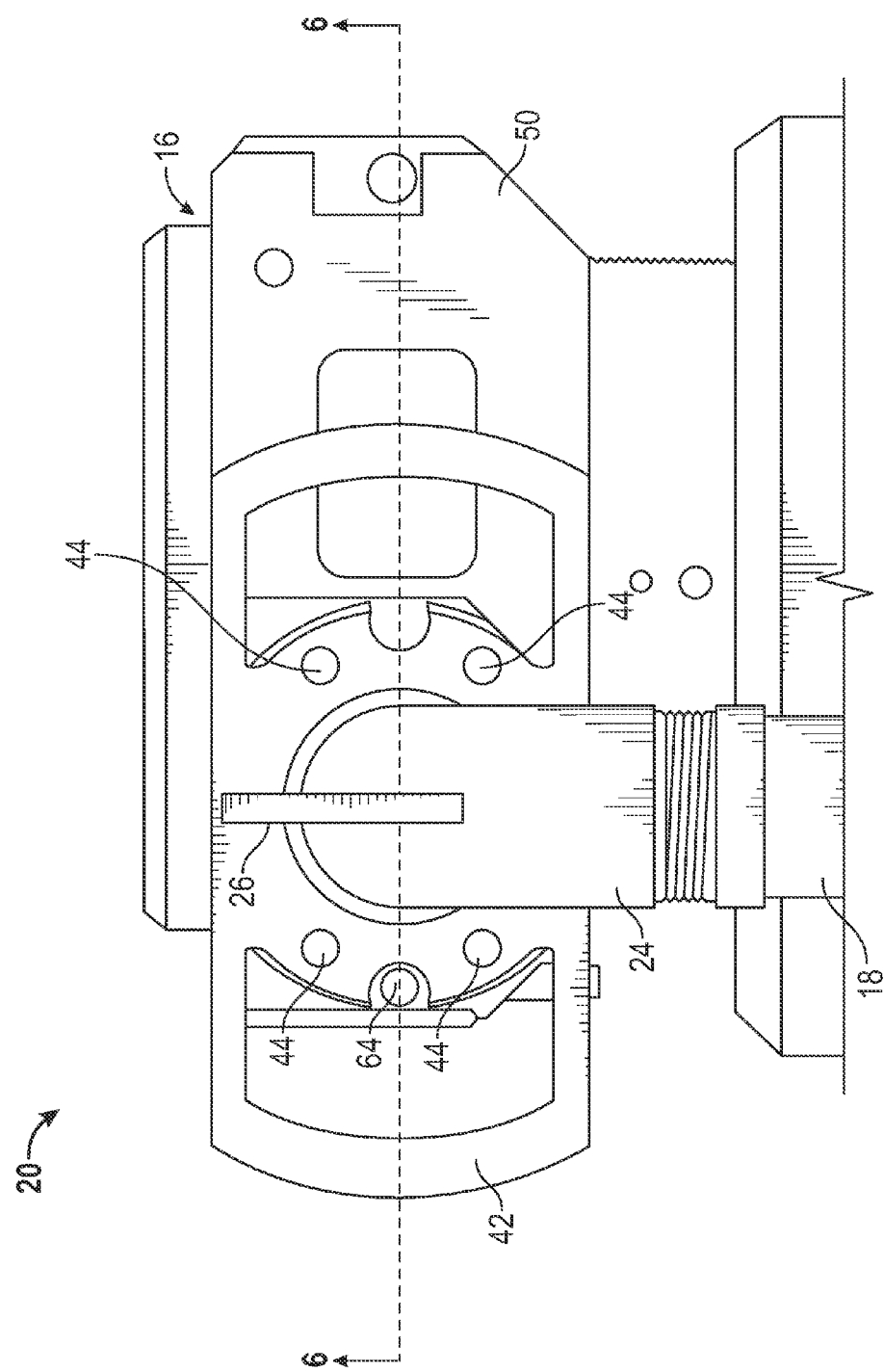
FIG. 5 is a front view of an exemplary cement swivel with stinger assembly attached in accordance with the present invention.
Figure 6:
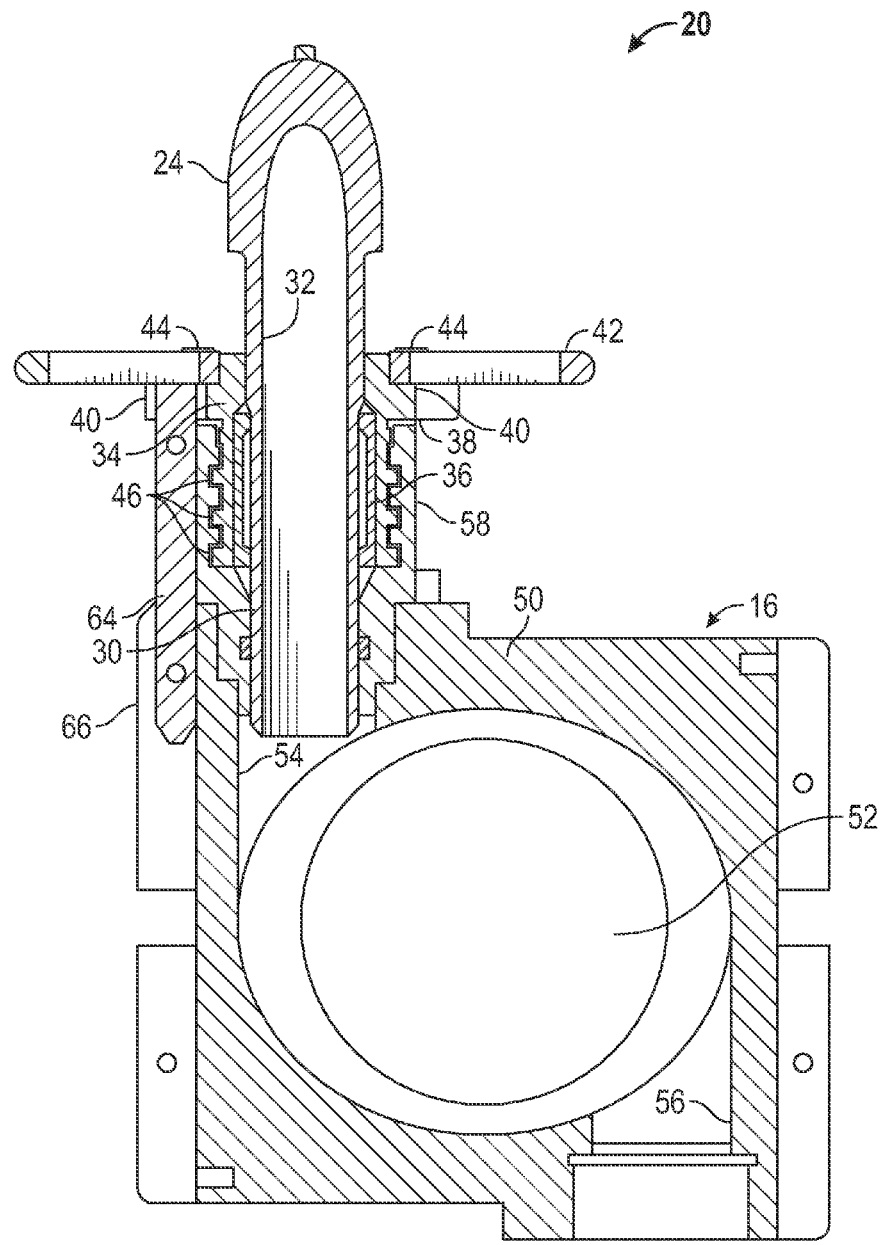
FIG. 6 is a cross-sectional view taken along lines 6-6 in FIG. 5.
Figure 8:
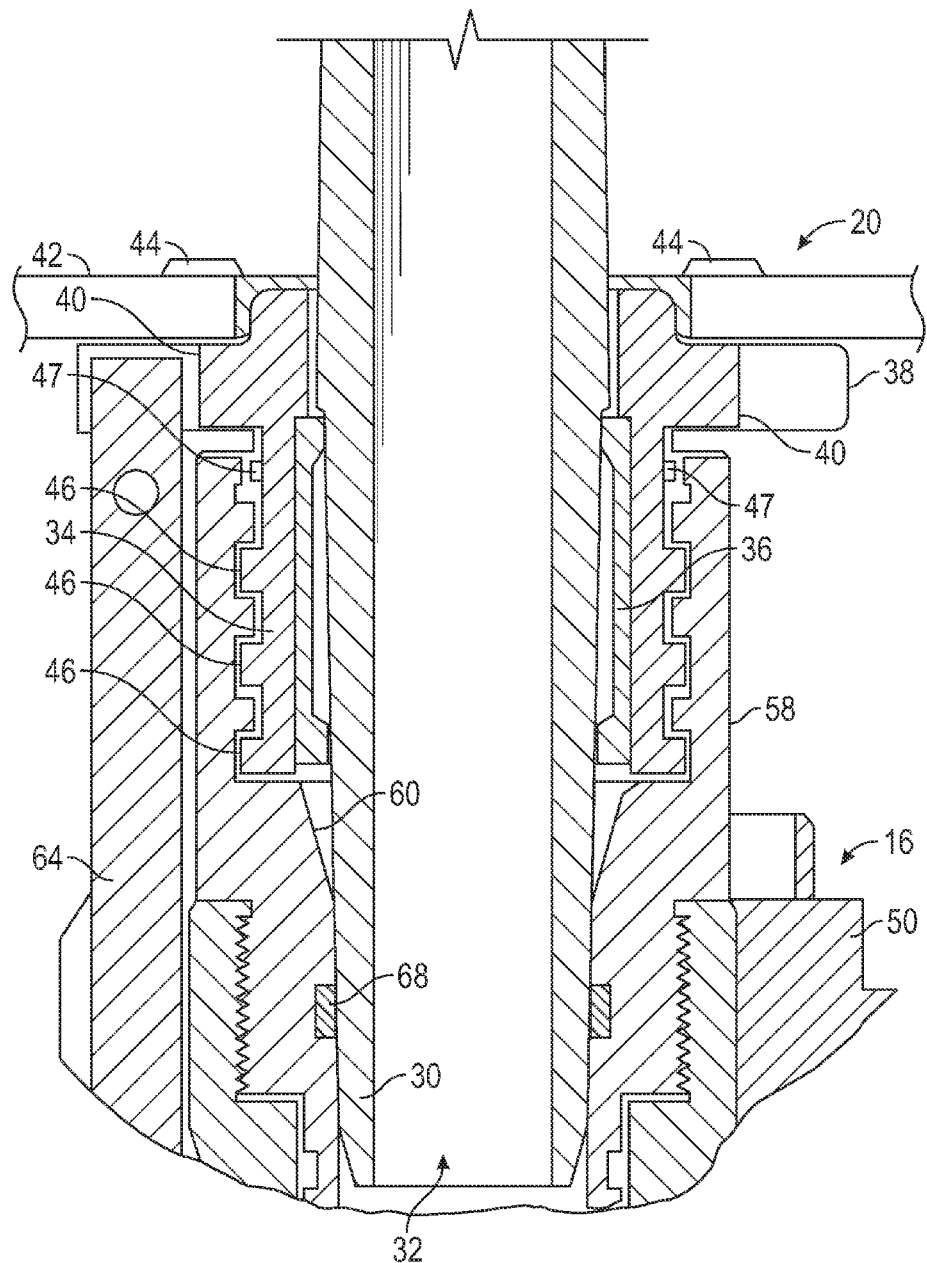
FIG. 8 is an enlarged cross-sectional view of portions of an exemplary coupling in accordance with the present invention.
Figure 13:
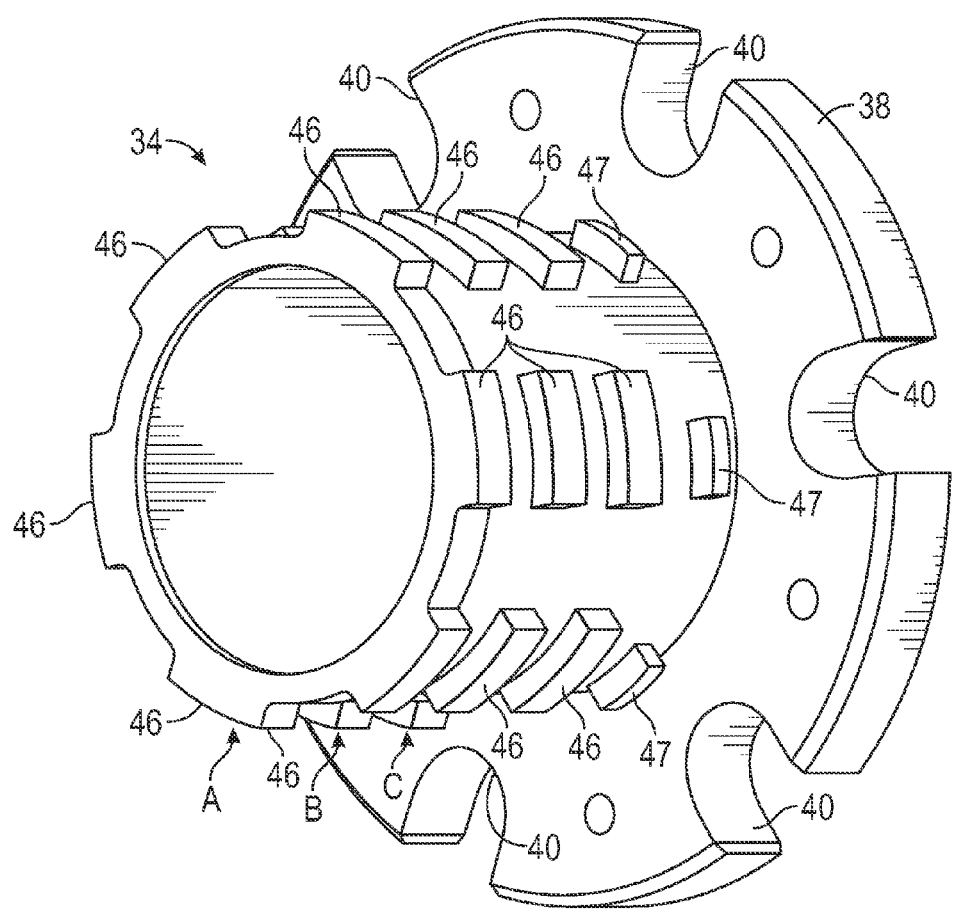
FIG. 13 is an isometric view of an exemplary breech lock barrel shown apart from other components of the coupling.

The structure and operation of an exemplary stinger assembly 20 are better appreciated with further reference to FIGS. 2-4. The stinger assembly 20 includes a curved rigid pipe portion 24 that is affixed to the hose 18. A flange 26 with lifting eye 28 extends upwardly from the pipe portion 24. A stinger 30 extends outwardly from the pipe portion 24. A cement flow path 32 is defined within the pipe portion 24 and stinger 30. A breech lock barrel 34 radially surrounds the stinger 30 and, as can be seen best in FIGS. 4 and 8, secured to the stinger 30 by a sleeve 36 that preferably permits the breech lock barrel 34 to rotate about the stinger 30. FIG. 13 shows the breech lock barrel 34 apart from the other components of the stinger assembly 20. A flange 38 projects radially outwardly from the breech lock barrel 34 and presents at least one indentation 40. In the depicted embodiment, there are six indentations 40. In preferred embodiments, an enlarged grippable handle 42 also radially surrounds the stinger 30 and is secured by bolts 44 (FIG. 2) to the breech lock barrel 34 so that the stinger 30 will be rotated when the handle 42 is rotated.

The outer radial surface of the breech lock barrel 34 preferably presents a plurality of raised keys 46. As will be appreciated with regard to FIGS. 2, 3, 4 and 8, the keys 46 are organized into rows (A, B and C) and perpendicular columns. The keys 46 are spaced apart from each other along each of the rows A, B and C and each of the columns. In some embodiments, there are six keys 46 per row A, B and C spaced angularly from each other at about 30 degrees apart. In certain embodiments, the breech lock barrel 34 also includes a row of raised anti-rotation locking dogs 47. In the depicted embodiment, there are six locking dogs 47 that are positioned in a spaced relation from one another of about 30 degrees apart.

Figure 11:
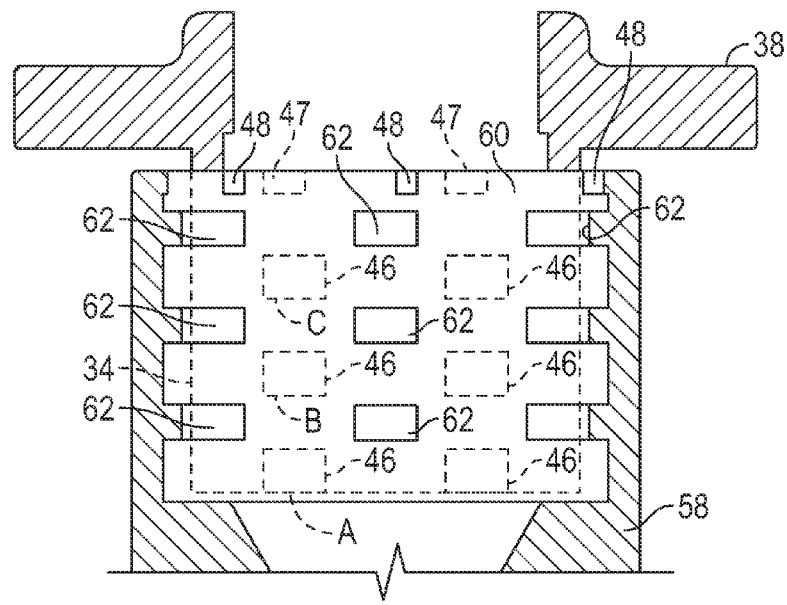
FIG. 11 is a cross-sectional view, partially in phantom, showing portions of the stinger assembly and cement swivel in an unsecured condition.
Figure 12:
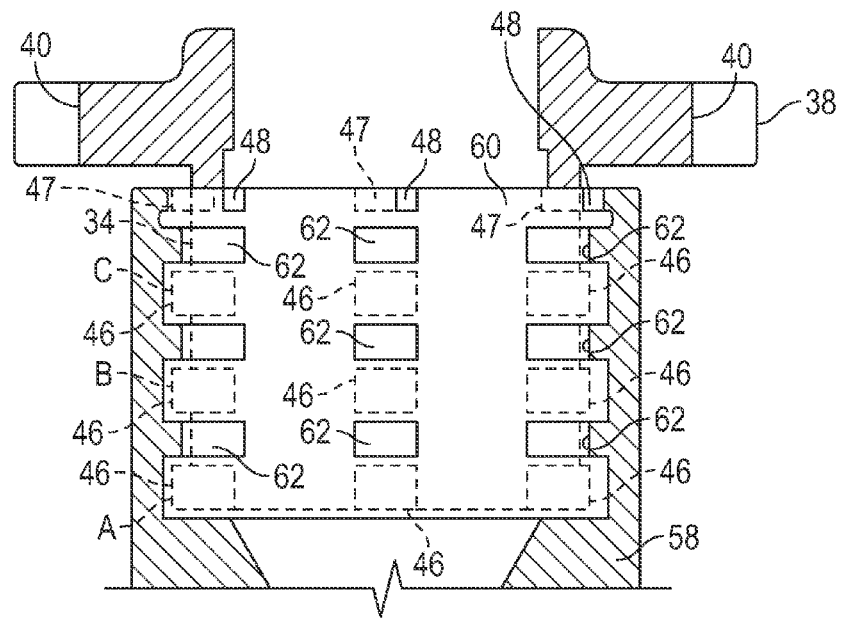
FIG. 12 is a cross-sectional view, partially in phantom, showing portions of the stinger assembly and cement swivel now in a secured condition.

The structure of the exemplary top drive cement swivel 16 is better understood with reference to FIGS. 5-10. It can be seen that the cement swivel 16 has a generally box-shaped main housing 50. A central axial flowbore 52 passes vertically through the main housing 50. Lateral fluid flow openings 54, 56 extend through the main housing 50 and permit fluid communication between the central flowbore 52 and the exterior of the cement swivel 16. A tubular breech lock box connector 58 extends outwardly from the main housing 50. As illustrated in FIGS. 11 and 12, the breech lock box connector 58 defines an interior bore 60 having a plurality of inwardly projecting ridges 62. The ridges 62 are spaced apart from each other both radially and axially within the bore 60. Preferably, the interior bore 60 also includes an annular fluid seal 63 (FIG. 8) that creates a fluid seal against the stinger 30 when it is inserted into the bore 60. In addition, the interior bore 60 also presents a row of inwardly projecting anti-rotation locking dogs 48. The dogs 48 are meant to be complimentary to the anti-rotation dogs 47 of the breech lock barrel 34.

Figure 9:
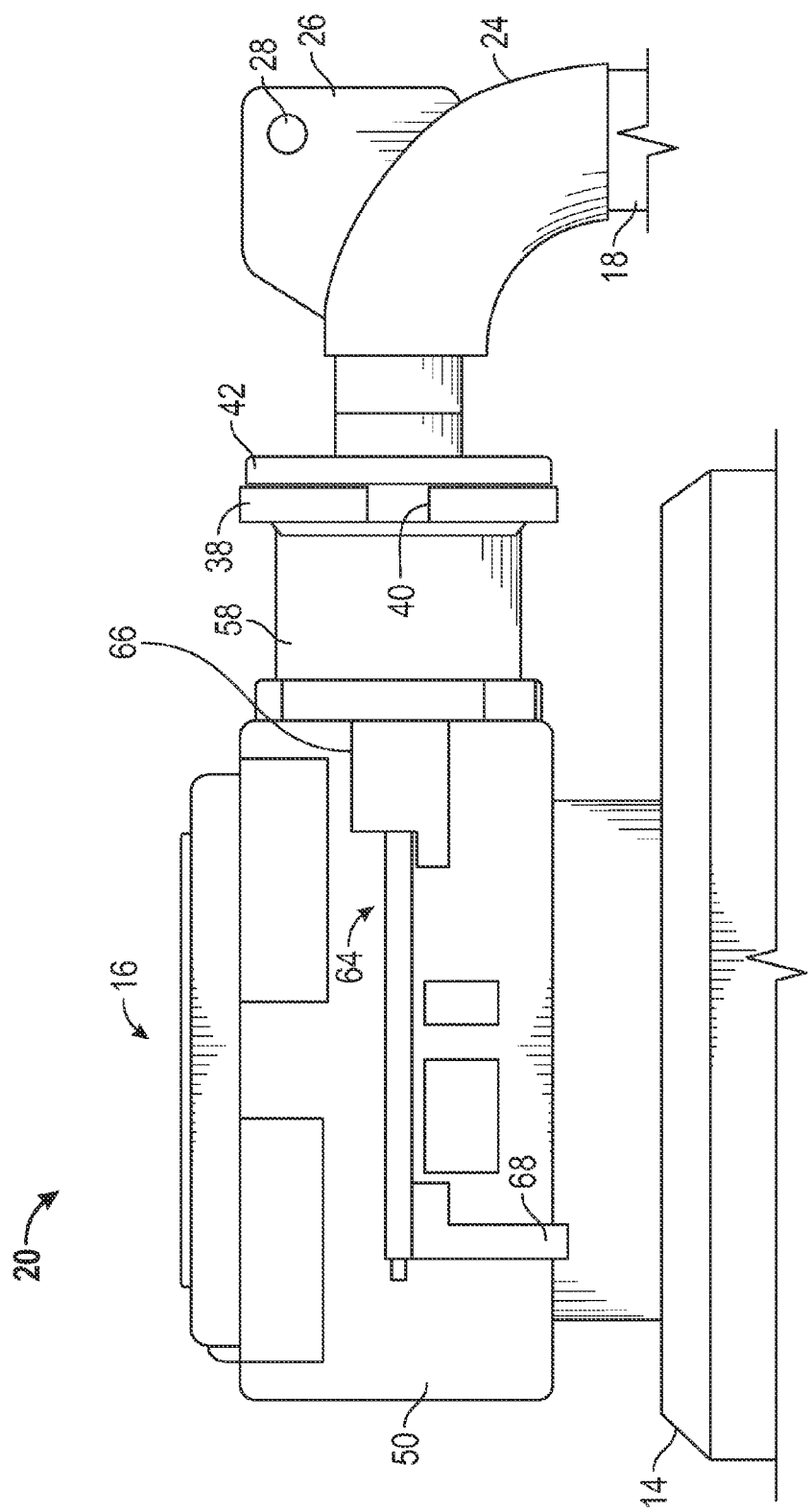
FIG. 9 is a side view of the exemplary cement swivel and stinger assembly shown in an unlocked condition.
Figure 10:
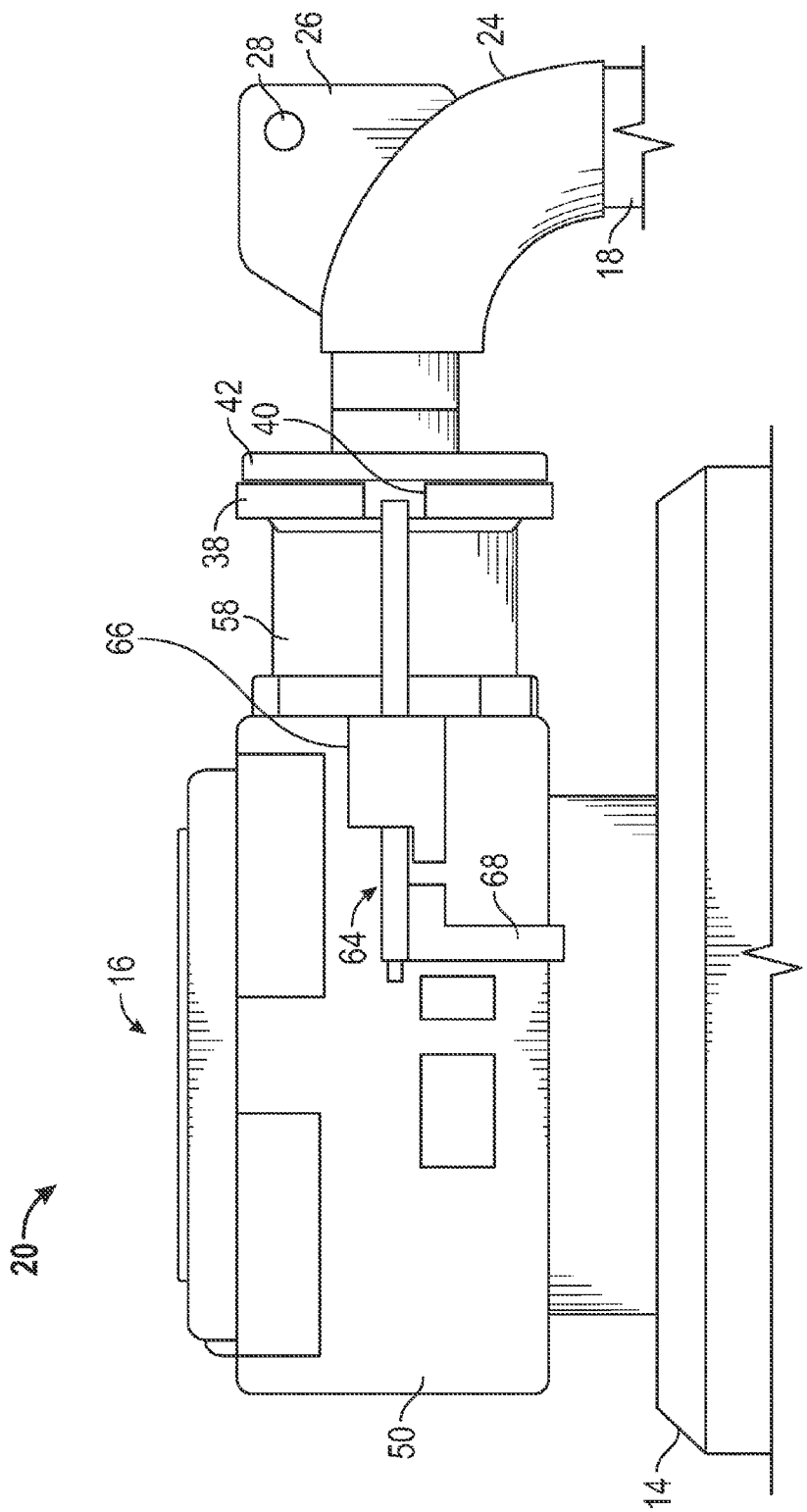
FIG. 10 is a side view of the cement swivel and stinger assembly of FIG. 9, now in a locked condition.

FIGS. 9 and 10 illustrate a locking pin 64 which is preferably used with the cement swivel 16 and is used to lock the stinger assembly 20 into a coupled position with respect to the cement swivel 16. The locking pin 64 is preferably retained by a sleeve 66 and is axially shiftable between two positions. In the unlocked position shown in FIG. 9, the locking pin 64 does not prevent rotation of the stinger assembly 20 with respect to the cement swivel 16. In the locked position shown in FIG. 10, the locking pin 64 is disposed within an indentation 40 of the flange 38 and will prevent rotation of the stinger assembly 20 with respect to the cement swivel 16. In particular embodiments, the locking pin 64 has a handle portion 68 that can be used to rotate and shift the locking pin 64 between the unlocked and locked positions.

Figure 7:
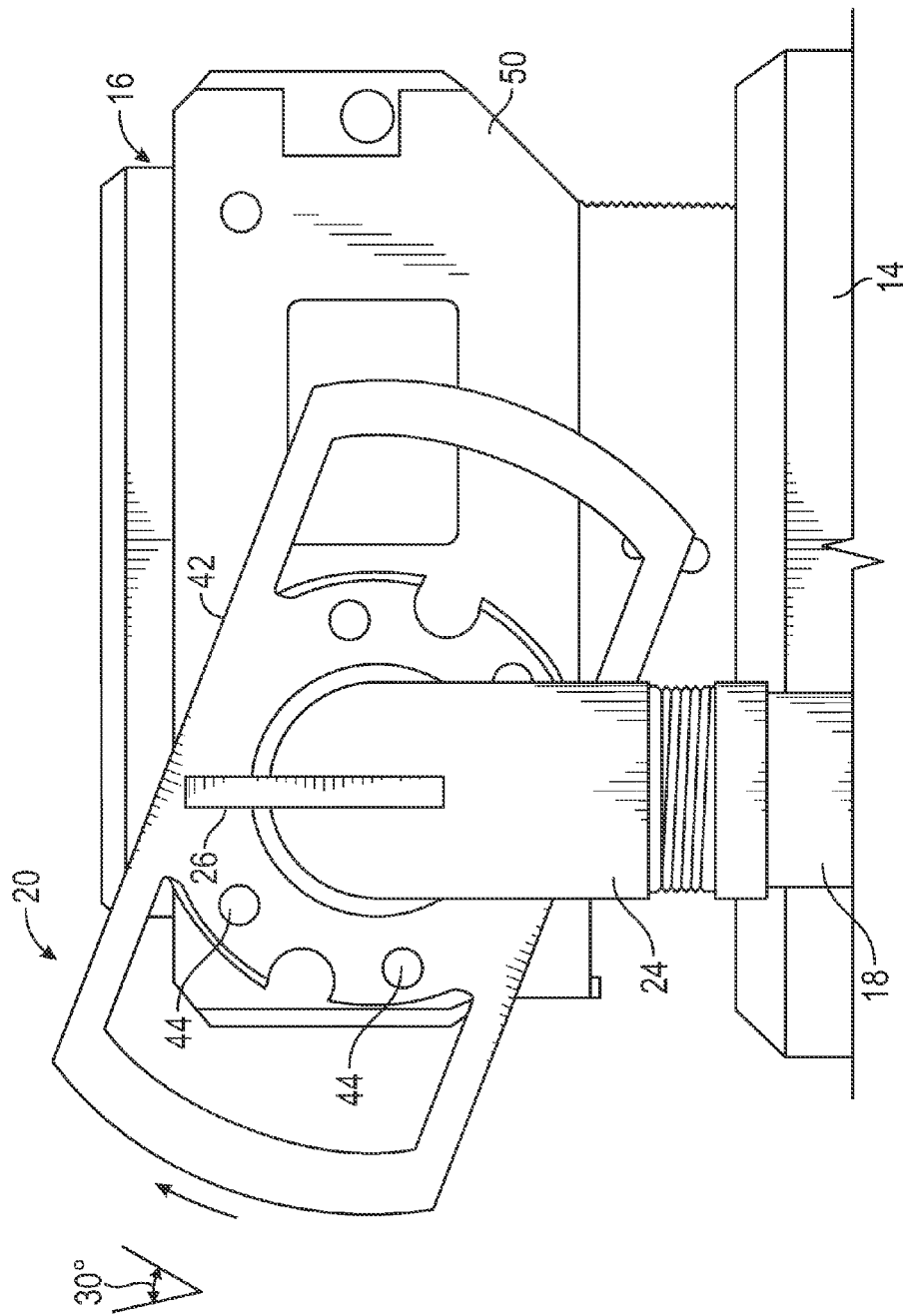
FIG. 7 is a front view of the cement swivel and stinger assembly depicting the stinger assembly being coupled to the swivel.

In operation, a user can rapidly couple or uncouple the cement conduit 18 to the cement swivel 16. In order to couple the stinger assembly 20 to the cement swivel 16, the block and tackle 22 is used to lift and move the stinger assembly 20 by lifting eye 28 until the stinger assembly 20 is proximate the breech lock connector 58 of the cement swivel 16. A user can then grasp the handle 42 of the stinger assembly 20 and rotate the stinger assembly 20 to the approximate position shown in FIG. 7. In FIG. 7, the stinger assembly 20 is rotated approximately 30 degrees from the vertical, as illustrated in FIG. 7. This rotation will align the keys 46 of the stinger assembly 20 angularly between the ridges 62 of the breech lock barrel bore 60 so that the breech lock barrel 34 can be fully inserted into the bore 60, as illustrated in FIG. 11. Once fully inserted, the user will rotate the stinger assembly 20 approximately 30 degrees back to the position depicted in FIG. 5. This rotation will move the raised keys 46 of the breech lock barrel 34 to the position illustrated in FIG. 12, wherein each key 46 is located behind a ridge 62 within the bore 60. Also, each row A, B and C of keys 46 is located behind a row of ridges 62. The locking dogs 47 will radially abut the dogs 48 of the bore 60 (as depicted in FIG. 12), preventing further rotation beyond 30 degrees. In this position, the stinger assembly 20 cannot be axially withdrawn from the bore 60. The stinger assembly 20 is now coupled to the cement swivel 16. The user can now move the locking pin 64 from the unlocked position (FIG. 9) to the locked position (FIG. 10) as described previously. Seating of the locking pin 64 within the indentation 40 will prevent the stinger assembly 20 from being inadvertently rotated and uncoupled from the cement swivel 16. Cement can now be flowed along the cement flow path 32 from the cement conduit 18 into the lateral flow opening 54 of the cement swivel and into the central flowbore 52 of the cement swivel 16.

In order to uncouple the stinger assembly 20 from the cement swivel 16, a user will reverse the operations. The locking pin 64 is moved from the locked position (FIG. 10) to the unlocked position (FIG. 9). A user can then rotate the stinger assembly 20 approximately 30 degrees to the position illustrated in FIG. 7. The stinger assembly 20 can then be axially withdrawn from the bore 60 of the breech lock connector 58.

The foregoing description is directed to particular embodiments of the present invention for the purpose of illustration and explanation. It will be apparent, however, to those skilled in the art that many modifications and changes to the embodiment set forth above are possible without departing from the scope and the spirit of the invention.

What is claimed is:

1. A coupling for releasably connecting a fluid conduit to a port, the coupling comprising:
   a stinger assembly affixed to the conduit, the stinger assembly having a generally cylindrical stinger for carrying fluid from the fluid conduit to the port and a generally cylindrical breech lock barrel radially surrounding the stinger and presenting at least one raised key upon the breech lock barrel;
   a breech lock connector associated with the port, the breech lock connector comprising a bore that is shaped and sized to receive the stinger and the breech lock barrel within the bore and having at least one radially inwardly projecting ridge;
   wherein, the stinger assembly can be secured to the breech lock connector by inserting the stinger assembly within the bore at a rotational angle wherein the at least one key is angularly unaligned with the at least one ridge and then rotating the stinger assembly so that the at least one key is located behind and angularly in line with the at least one ridge; and
   a locking assembly comprising a locking pin that is retained within a sleeve and is axially shiftable within the sleeve between a locked position, wherein the pin is inserted into an indentation on the breech lock barrel, thereby preventing rotation of the stinger assembly within the bore, and an unlocked position, wherein the pin is removed from the indentation, thereby allowing rotation of the stinger assembly within the bore.

2. The coupling of claim 1 further comprising a handle that radially surrounds the stinger.

3. The coupling of claim 1 wherein there is a plurality of keys and a plurality of ridges.

4. The coupling of claim 1 further comprising a lifting eye for lifting the stinger assembly.

5. The coupling of claim 1 further comprising:
a first anti-rotation dog located on the breech lock barrel; and
a second anti-rotation dog in the bore, the first and second anti-rotation dogs shaped and sized to abut each other radially to limit rotation of the stinger assembly within the bore.

6. A coupling releasably connecting a cement conduit to a cement swivel associated with a wellbore cementing tool, the coupling comprising:
a stinger assembly affixed to the cement conduit, the stinger assembly having a generally cylindrical stinger for carrying cement from the cement conduit to the cement swivel and a generally cylindrical breech lock barrel radially surrounding the stinger and presenting a plurality raised keys upon the breech lock barrel;
a breech lock connector on the cement swivel, the breech lock connector comprising a bore that is shaped and sized to receive the stinger and the breech lock barrel within the bore and having a plurality of inwardly projecting ridges;
wherein, the stinger assembly can be secured to the breech lock connector by inserting the stinger assembly within the bore at a rotational angle wherein the keys are angularly unaligned with the ridges and then rotating the stinger assembly so that the keys are each located behind and angularly in line with a ridge;
an anti-rotation dog located on the breech lock barrel; and
an anti-rotation dog in the interior bore, the anti-rotation dogs of the breech lock barrel and the bore shaped and sized to abut each other radially to limit rotation of the stinger assembly within the interior bore.

7. The coupling of claim 6 further comprising a locking arrangement for securing the stinger against rotation within the breech lock connector.

8. The coupling of claim 6 wherein the locking arrangement comprises:
a locking pin that is retained within a sleeve and is axially shiftable within the sleeve between a locked position, wherein the pin is inserted into an indentation on the breech lock barrel, thereby preventing rotation of the stinger assembly within the bore, and an unlocked position, wherein the pin is removed from the indentation, thereby allowing rotation of the stinger assembly within the bore.

9. The coupling of claim 6 further comprising a handle that radially surrounds the stinger.

10. The coupling of claim 6 further comprising a lifting eye for lifting the stinger assembly.

11. A method for releasably coupling a cement conduit stinger assembly to a bore within a cement swivel associated with a wellbore cementing tool, the method comprising the steps of:
moving the stinger assembly proximate a bore within the cement swivel, the stinger assembly having a stinger with a breech lock barrel that presents a radially outwardly projecting key;
orienting the stinger assembly so that the key is angularly unaligned with an inwardly-projecting ridge within the bore;
axially moving the stinger and breech lock barrel of the stinger assembly into the bore;
rotating the stinger assembly so that the key is angularly aligned behind the ridge, preventing the stinger assembly from being withdrawn from the bore; and
flowing cement from the cement conduit into the cement swivel.

12. The method of claim 11 further comprising locking the stinger assembly against rotation with respect to the cement swivel by axially shifting a locking pin that is shiftable within a sleeve from an unlocked position, wherein the pin is removed from an indentation on the breech lock barrel, thereby allowing rotation of the stinger assembly within the bore, to a locked position wherein the pin is inserted into the indentation thereby preventing rotation of the stinger assembly within the bore.

13. The method of claim 12 wherein the step of locking the stinger assembly comprises moving a locking pin associated with the cement swivel into seated engagement within an indentation on the stinger assembly.

* * * * *